US005083493A

United States Patent [19]

Heo

[11] Patent Number: 5,083,493

[45] Date of Patent: Jan. 28, 1992

[54] ELECTRONIC MUSICAL INSTRUMENT HAVING KEY TRANSPOSE FUNCTION AND A METHOD THEREFOR

[75] Inventor: Tae-Kyoung Heo, Kyounggi, Rep. of Korea

[73] Assignee: SamSung Electronics Co., Ltd., Suwon, Rep. of Korea

[21] Appl. No.: 537,999

[22] Filed: Jun. 14, 1990

[30] Foreign Application Priority Data

Jun. 28, 1989 [KR] Rep. of Korea .................. 1989-8952

[51] Int. Cl.$^5$ ........................ G10H 7/00; G10H 5/00; H02M 5/00

[52] U.S. Cl. ........................................ 84/619; 84/657; 84/445

[58] Field of Search .................................. 84/600-602, 84/615, 618, 619, 647, 653, 657, 685, 445

[56] References Cited

U.S. PATENT DOCUMENTS 4,176,573 12/1979 Deutsch ............................ 84/445 X
4,406,203 9/1983 Okamoto et al. ................. 84/445 X
4,618,851 10/1986 Watanabe ......................... 84/649 X
4,724,736 2/1988 Isozaki ............................. 84/445 X

*Primary Examiner*—William M. Shoop, Jr.
*Assistant Examiner*—Jeffrey W. Donels
*Attorney, Agent, or Firm*—Robert E. Bushnell

[57] ABSTRACT

There is provided an electronic musical instrument for transposing the key comprising a key transpose switching means, a key board having multiple keys each assigned with an identification number, a microcomputer for processing the state signals of the switching means and the depressed key signals of the key board to produce key transpose data, a sound generator for producing the key-transposed sound according to the key transpose data produced from the microcomputer, a D/A converter for converting the key-transposed sound into an analog signal, an amplifier for amplifying the analog signal of the D/A converter, and a low pass filter for filtering the amplified sound to deliver it to a speaker.

9 Claims, 7 Drawing Sheets

| DKT | UKT | STATUS |
|---|---|---|
| 0 | 0 | NO KEY TRANSPOSE |
| 0 | 1 | UP KEY TRANSPOSE |
| 1 | 0 | DOWN KEY TRANSPOSE |
| 1 | 1 | NOT DEFINED |

ELECTRONIC MUSICAL INSTRUMENT HAVING KEY TRANSPOSE FUNCTION AND A METHOD THEREFOR

TECHNICAL BACKGROUND

This invention concerns a key transpose process of an electronic musical instrument, and particularly an electronic musical instrument, wherein the state of a key transpose switch and depressed key signals of a key board switch are analyzed to obtain key transpose data, so that the instrument may readily transpose a key.

Generally, the key transpose is accomplished by raising or lowering the key, at which a music is played, by a semitone (half tone). A conventional electronic musical instrument having the key transpose function, as shown in FIG. 1, includes a key transpose switching unit 100 for generating a key transpose signal, and microcomputer 110 for processing the depressed key signals of key board switch 108 according to the key transpose signal.

The key transpose switching unit 100 includes key transpose switch 104, up-key transpose switch 102 and down-key transpose switch 106, in which the up and down-key transpose switches 102, 106 should be selectively depressed a desired number of times to generate a control signal for controlling the microcomputer 110 to produce the key transpose data to the depressed key signals of the key board switch 108. The key transpose data is applied to a sound generator 112 to produce key-transposed sound delivered to a speaker 120 through a digital to analog converter (D/A converter) 114, amplifier 116 and low pass filter 118.

In such a conventional electronic musical instrument, there is an inconvenience in that the player of the instrument must count the number of half tones included between the presently played key and the key to be transposed, so that the player may selectively operate the up and down-key transpose switches 102 and 106 according to the number of the half tone, thereby accomplishing the key transpose.

SUMMARY OF THE INVENTION

Accordingly, an object of the present invention is to provide an electronic musical instrument for transposing a key by automatically counting the number of the half tones included between a presently played key and a key to be transposed, Another object of the present invention is to provide an electronic musical instrument having a simplified key transpose switching unit.

Still another object of the present invention is to provide a method of implementing a key transpose function by automatically counting the number of half tones included between a presently played key and a key to be transposed.

According to one aspect of the present invention, there is provided an electronic musical instrument including a key transpose switch, a key board and a microcomputer for processing the signals of the key transpose switch and the key board. The instrument to achieve the above objects determines whether or not the key transpose switch is activated; detects the identification number of the depressed key of the key board when the key transpose switch is activated; analyzes the identification number; and processes the depressed key signals of the key board according to the result of the previous analyzing, thereby transposing the key.

According to another aspect of the present invention, an electronic musical instrument for transposing the key, includes: a key transpose switching unit; a key board having multiple keys each assigned with an identification number; a microcomputer for processing the state signals of the switching means and the depressed key signals of the key board to produce key transpose data; a sound generator for producing the key-transposed sound according to the key transpose data produced from the microcomputer; a D/A converter for converting the key-transposed sound into an analog signal; an amplifier for amplifying the analog signal of the D/A converter; and a low pass filter for filtering the amplified sound to deliver it to a speaker.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF CERTAIN PREFERRED EMBODIMENTS

Figure 1:
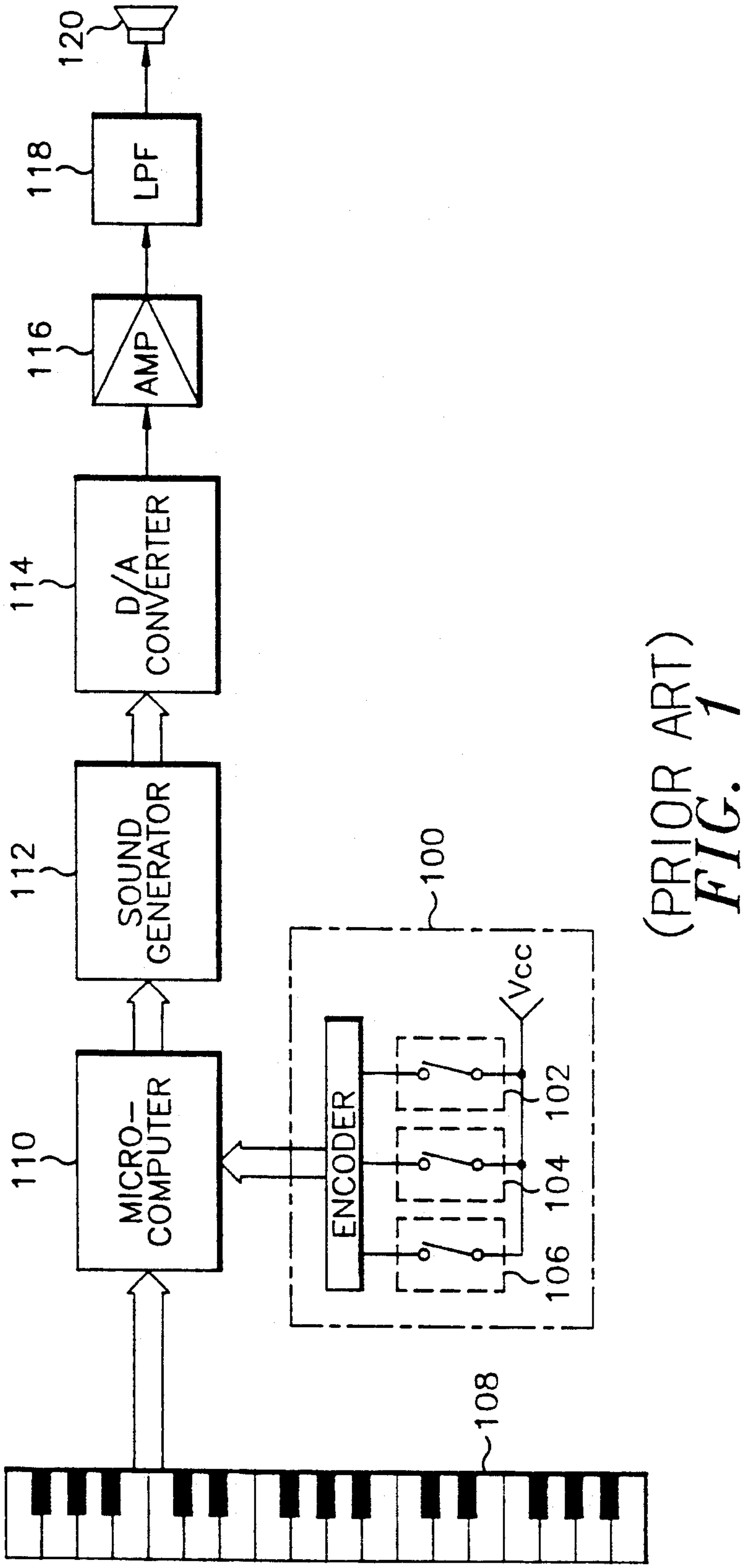
(PRIOR ART) FIG. 1
FIG. 1 is a block diagram of a system of a conventional electronic musical instrument having the key transpose function.
Figure 2:
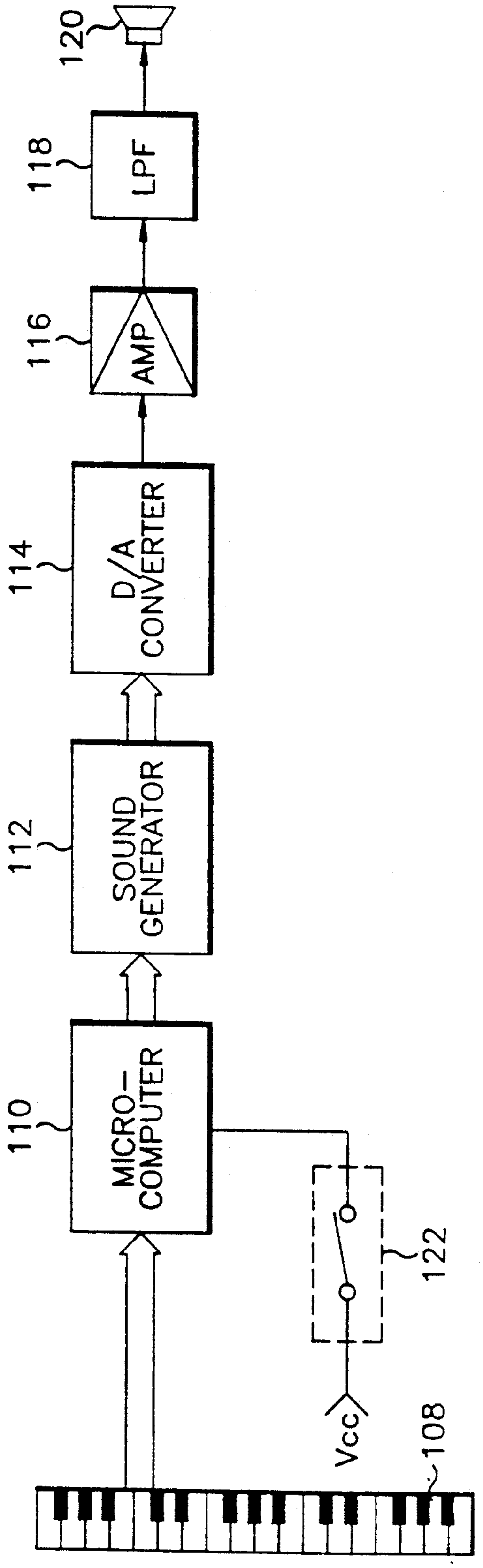
FIG. 2 is a system block diagram of an inventive electronic musical instrument having the key transpose function.

Referring to FIG. 2, key board switch 108 generates key signals, when the keys are depressed by a music player. The key of a music being played may be transposed to another key by a key transpose switch 122 that produces the key transpose enable signal. The depressed key signals and key transpose signal are applied to microcomputer 110 to count the number of the half tones included between the presently played key and the transposed key and to make an addition or reduction of the sound corresponding to the number of half tones to/from the depressed key signals, thus obtaining the key transposed signal (key transpose data) delivered to sound generator 112, which produces the sound digitally coded according to the key transpose data. The digitally coded sound is converted into an analog signal by D/A converter 114, by which the analog signal is delivered to amplifier 116, whose output signal is filtered through low pass filter 118, then delivered to speaker 120 to produce the key-transposed sound.

According to an embodiment of the present invention, when the key transpose switch 122 is activated, the microcomputer 110 begins to perform the desired key transpose function. Namely, the microcomputer 110 compares the transposed key with the presently played key to produce the key transpose data, the up-key data and the down-key data, so that the numerically coded key transpose data is added or subtracted to or from the numerically coded depressed key signals to raise or lower the key as desired, thus generating the depressed key signals as key-transposed that is applied to the sound generator 112 to produce the key-transposed sound.

Figure 3A:
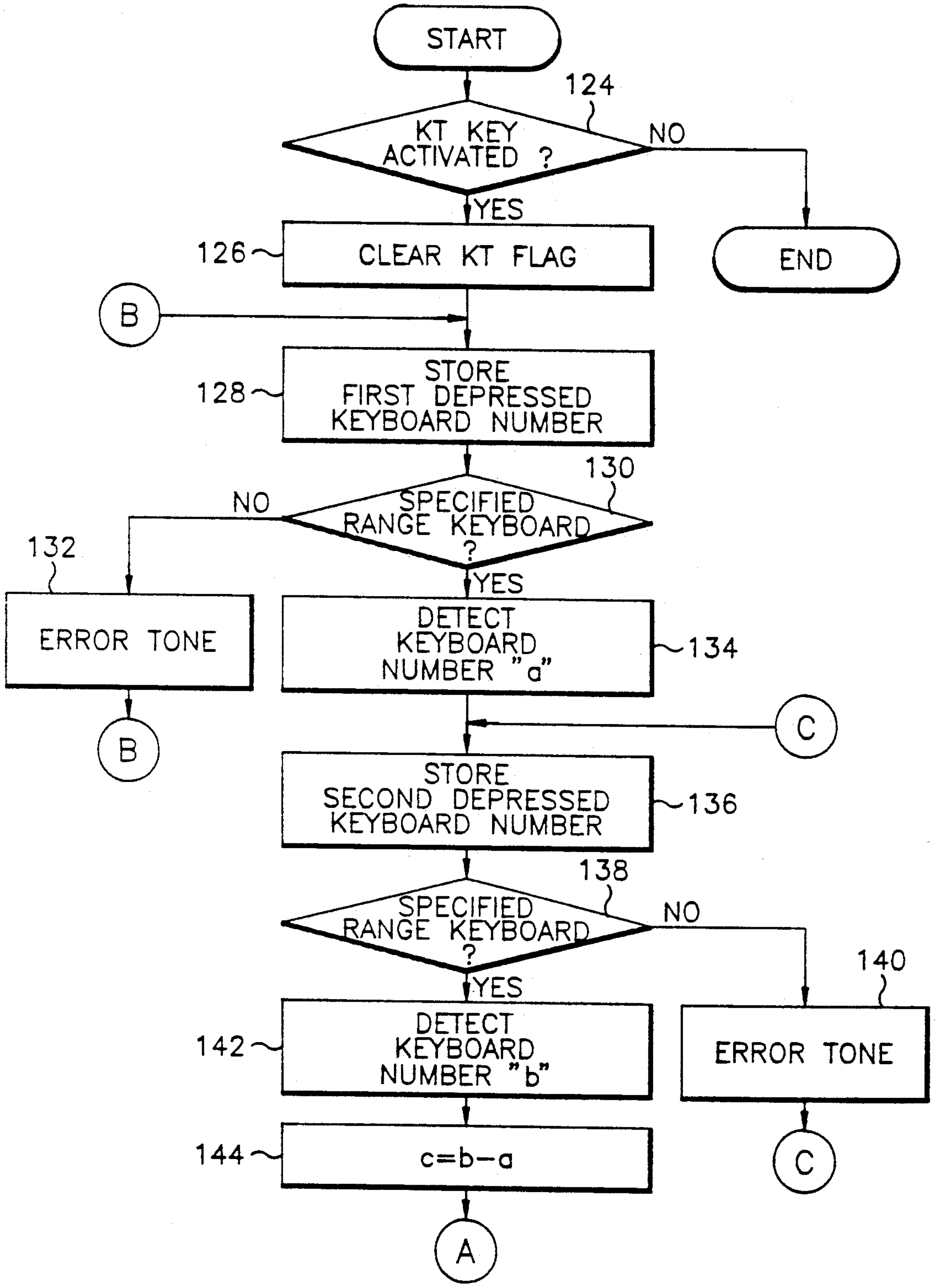
FIGS. 3A and 3B are a flow chart for illustrating the key transpose steps according to one embodiment of the present invention.
Figure 3B:
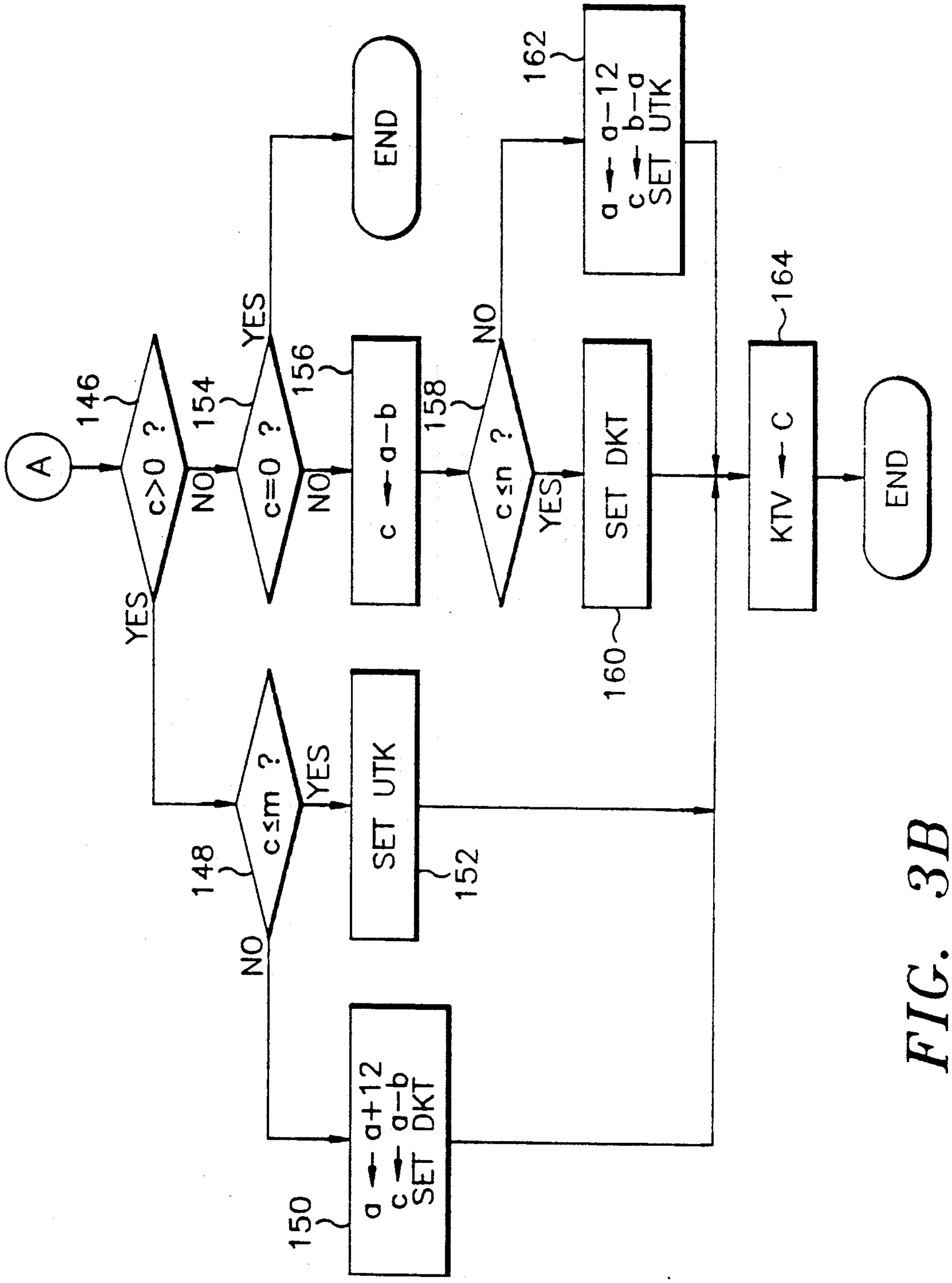

Referring to FIGS. 3 and 3B, for illustrating the -operation of the microcomputer 110, in step 124 a check is made to determined whether or not the key transpose switch 122 is activated. When the key transpose switch 122 is activated, the key transpose flags (hereinafter referred to as KT flags) are all cleared, while the presently established KT flags are maintained when the key transpose switch 122 is not activated. The KT flags consist of two flags, one of which represents the up-key transpose (hereinafter referred to as UKT) flag, and the other the down-key transpose (hereinafter referred to as DKT) flag, as shown in FIG. 5A.

Figures 5A, 5B:
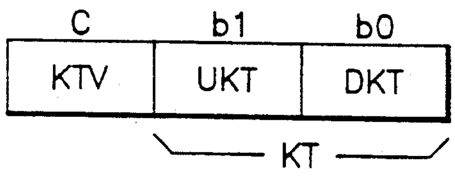
FIGS. 5A and 5B illustrate an example of the key transpose flag and status thereof according to the present invention.

According to this embodiment, the UKT and DKT flags are logically combined, as shown in FIG. 5B. Here, the clearing of the KT flag means to ignore the previously established key transpose data and then prepare for the newly established key transpose data.

After the KT flag is cleared in the step 126, the key board switch 108 is key-scanned in step 128 to store the data corresponding to the first depressed key into a register. Thereafter, in step 130 a check is made to determine whether or not the first depressed key comes within the predetermined range (according to this embodiment, the keys within the range of F3–F4#). Subsequently, when the first depressed key is outside the predetermined range, the error signal is generated in step 132 and the system returns to step 128 to await the first depressed key signal coming in the predetermined range.

Figure 4:
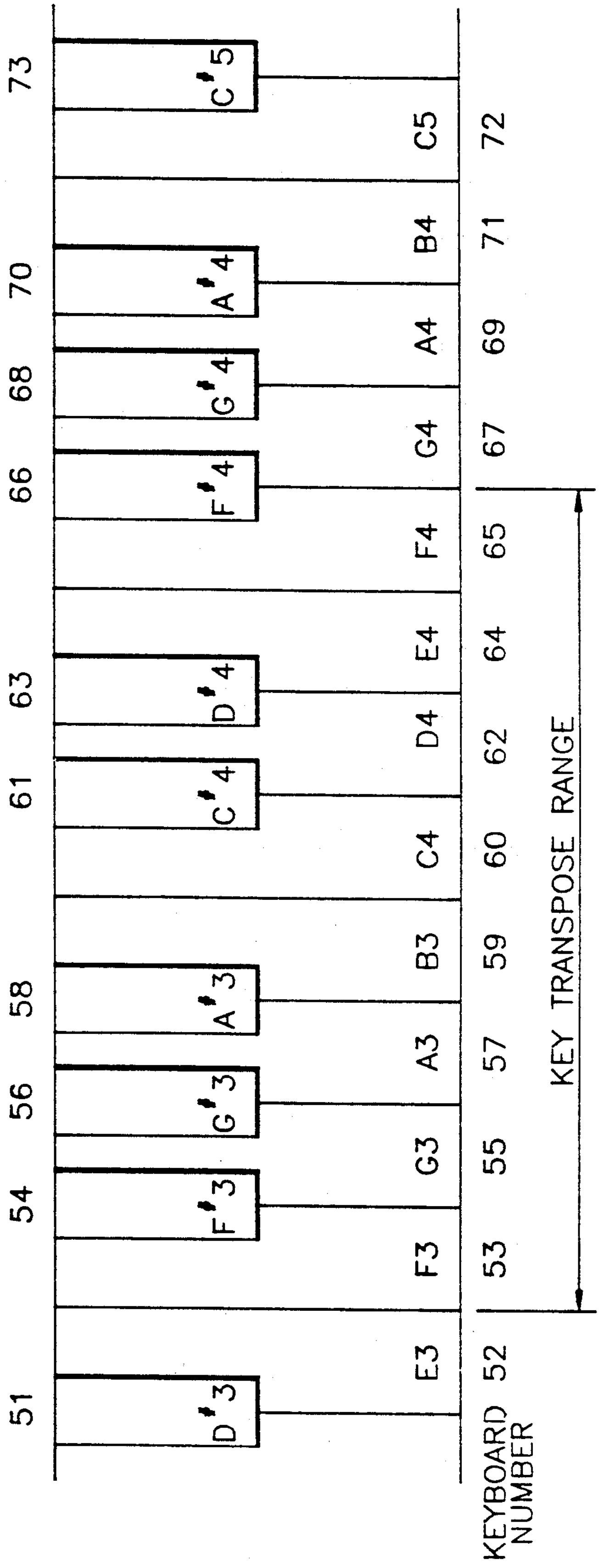
FIG. 4 illustrates an example of a key board having multiple keys each assigned with an identification number according to the present invention.

However, when the first depressed key comes in the predetermined F3–F4#, its identification number a is detected in step 134. The identification number a represents the corresponding key as shown in FIG. 4.

After detecting the identification number a, a check is made in step 138 to determine whether or not the second depressed key signal in step 136 comes within the predetermined range, as with the first depressed key. When the second depressed key does not come within the range, the error signal is generated in step 140 and the system returns to step 136 to await the second depressed key signal coming within the range. However, when the second depressed key signal comes within the range, its identification number b is detected in step 142.

Thereafter, the first depressed key identification number a is subtracted from the second depressed key identification number b to obtain key transpose value c in step 144. In step 146 a check is made to determine whether or not the key transpose value c is greater than 0. According to the present embodiment, when the key transpose value c is greater than 0 then the up-key transpose is performed, while if the key transpose value c is smaller than 0 then the down-key transpose is performed key. Hence, if the key transpose value c is greater than 0, in step 148 a check is made to determine whether or not the key transpose value c comes within the up-key limit m, i.e., $c \leqq m$. Generally, the electronic musical instrument has a predetermined key transpose range. In the present embodiment, the transpose range is $-m \sim +n$, and $m+n<12$, and it is assumed that $m=6$ and $n=5$. When the key transpose value c exceeds the up-key limit (i.e., $c>m$), the first depressed key identification number a is increased by 12 (1 octave), and the second depressed key identification number b is subtracted therefrom to give a new key transpose value c. Then, the DKT flag is set.

However, when the key transpose value c is smaller than or equal to m, i.e., not exceeding the up-key limit, in step 148, the UKT flag is set in step 152.

Meanwhile, when the key transpose value is smaller than 0 the down-key transpose is performed in step 156. In step 154 it a check is made determine whether or not the counted key transpose value c equals 0. If the key transpose value c equals 0, thus not requiring the key transpose, the transpose process is ended However, if the key transpose value c does not equal 0, thus being smaller than 0, the second depressed key identification number b is subtracted from the first depressed key identification number a to obtain the key transpose value c in step 156. Then, in step 158 a check is made to determine whether or not the key transpose value is equal to or less than the down-key limit n (i.e., $c \leqq n$). If the key transpose value is equal to or less than the down-key limit, the DKT flag is set in step 160. Otherwise, the first depressed key identification number a is decreased by 12 (1 octave) in step 162, which is subtracted from the second depressed key identification number b to give a new key transpose value c, and the UKT flag is set. After performing steps 150, 152, 160 and 162, each key transpose value c is stored into register KTV. Then, the operation is ended.

In order to grasp more clearly the operation of the inventive circuit and its practical effects, the key transpose operation will be described for the case of transposing G key to F key. When the player turns on the key transpose switch 122 and sequentially depresses keys G3 and F4, the microcomputer 110 sequentially detects and stores into the register the identification numbers $a=55$ of the G3 key and $b=65$ of the F4 key. Thereafter, the first key identification number $a=55$ is subtracted from the second key identification number $b=65$, thus obtaining the key transpose value of 10, in step 144. The key transpose value c is greater than 0, and therefore checked out to determine whether or not it exceeds the up-key limit m. The present invention is based on the fact that the transpose of G key to F key is generally accomplished by adding ten half tones to or subtracting two half tones from the G key. Hence, since the key transpose value 10 is greater than the up-key limit $m=6$, the identification number 55 of the first depressed key is increased by 12 corresponding to 1 octave to give a new number 67, from which is subtracted the second depressed key identification number 65 to obtain a new key transpose value $c=2$ stored into the KTV register, and the DKT is set.

Subsequently, the microcomputer 110 down-transposes the depressed key signal by the key transpose value ($c=2$) so as to produce the key transpose data delivered to the sound generator 112, which generates a digitally coded sound according to the key transpose data, which sound is converted into an analog signal by D/A converter 114, whose output drives the speaker 120 through the amplifier 116 and low pass filter 118.

Conversely, when the F key is transposed to the G key, the first depressed key identification number is 65 and the second depressed key identification number is 55, so that the key transpose value c obtained in step 144 is $55-65=-10$ that is below 0, and the operation proceeds through steps 146 and 154 to 156, where the second depressed key identification number 55 is subtracted from the first depressed key identification number 65, thus producing the key transpose data of 10 that is greater than the down-key limit (n=5). Hence, the operation proceeds from step 158 to step 162, so as to subtract 1 octave from the first depressed key identification number, which is the opposite to the previous case. Namely, 12 is subtracted from the first depressed key identification number 65 to give a new first depressed key identification number 53, which in turn is subtracted from the second key depressed identification number 55, thus obtaining the new key transpose data of 2 stored into the register. Then, the UKT flag is set.

Figure 6:
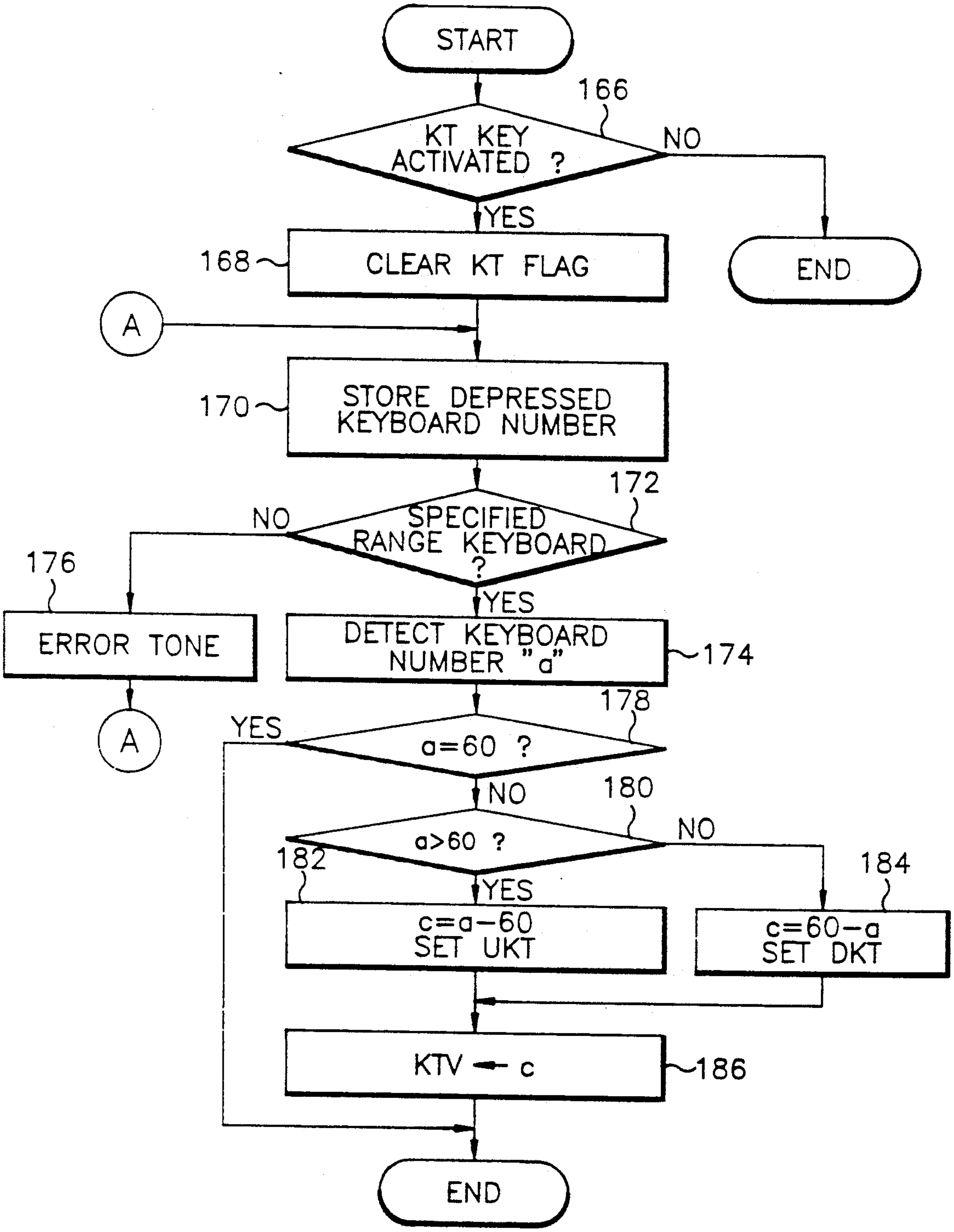
FIG. 6 is a flow chart for illustrating the key transpose steps according to another embodiment of the present invention.

Referring to FIG. 6 for illustrating another embodiment of the present invention, a check is made in step 166 to determine whether or not the key transpose switch is activated. If the key transpose switch is activated, the key transpose flag is cleared in step 168, while if not activated, the operation is ended. After step 168, the depressed key signal of the key board 108 is inputted in step 170, and a check is made to determine whether or not the presently depressed key comes within the predetermined range in step 172. If it does not come within the predetermined range, the error signal is generated in step 176, and the system returns to step 170 to prepare for the next key input. However, if the depressed key comes within the predetermined range in step 172, the identification number a of the key depressed is detected and stored into the register in step 174, and it a check is made in step 178 to determine whether or not the key identification number a agrees with the number 60 of the transpose reference key C4. If the above two numbers equal each other so as not to require the key transpose, the operation is ended, while if not equal, a check is made in step 180 to determine whether or not the depressed key identification number a is greater than 60. In this case, if greater, requires the up-key transpose, 60 is subtracted from the depressed key identification number a to produce the key transpose value c in step 182 and the UKT flag is set. Conversely, if the depressed key identification number a is smaller than 60, thus requiring the down-key transpose, the depressed key identification number a is subtracted from the transpose reference key number 60 in step 184 to produce the key transpose value c, and the DKT is set. Thereafter, each key transpose value c is stored into the register KTV and the operation is ended.

As described above, according to the present invention, the keys of the key board of an electronic musical instrument are each assigned with an identification number, so that the first depressed key identification number is compared to the second depressed key identification number or to a predetermined reference key identification number to obtain their difference, which determines the corresponding number of the half tones required to transpose the key. Hence, the player need not count the number of the half tones included between the presently played key and the transposed key in order to transpose the key.

While the invention has been particularly shown and described reference to a preferred embodiment, it will be understood by those skilled in the art that modifications in detail may be made without departing from the spirit and scope of the invention.

What is claimed is:

1. A method for transposing keys of a keyboard of an electronic musical instrument, each key having a corresponding identification number, said method comprising the steps of:
- determining whether or not a key transpose switch is activated;
- storing data of a first depressed key when said key transpose switch has been determined to have been activated;
- determining whether or not said first depressed key is within a predetermined range of said keyboard keys;
- detecting an identification number representing said first depressed key when it has been determined that said first depressed key is within said predetermined range;
- storing data of a second depressed key;
- determining whether or not said second depressed key is within said predetermined range of said keyboard keys;
- detecting an identification number representing said second depressed key when it has been determined that said second depressed key is within said predetermined range;
- generating a key transpose value by calculating the difference between said identification numbers of said first and second depressed keys; and
- determining whether or not said key transpose value is within a first or second predetermined limit, said first and second predetermined limits together being less than said predetermined range;
- storing said key transpose value into a register; and
- generating tones according to said stored key transpose value when said first depressed key is played after said key transposed switch is deactivated.

2. The method as set forth in claim 1, further comprising the steps of:
- generating an error tone when either of said first or second depressed keys has been determined to be outside said predetermined range.

3. The method as set forth in claim 1, wherein said step of determining whether or not said key transpose value is within a first or second predetermined limit comprises the steps of:
- determining whether or not said key transpose value is greater than zero;
- determining whether or not said key transpose value is less than or equal to said first predetermined limit if said key transpose value has been determined to be greater than zero;
- setting an up-key transpose flag if it has been determined that said key transpose value is less than or equal to said first predetermined limit;
- increasing said identification number of said first depressed key by one octave when it has been determined that said key transpose value is not less than or equal to said first predetermined limit, to develop a new identification number for said first depressed key;
- determining the difference between said new identification number and said identification number of said second depressed key to produce a new key transpose value; and
- storing said new key transpose value in said register.

4. The method as set forth in claim 1, wherein said step of determining whether or not said key transpose value is within a first or second predetermined limit comprises the steps of:
- determining whether or not said key transpose value is greater than zero;

determining whether or not said key transpose value is equal to zero if said key transpose value has been determined not to be greater than zero;

determining whether or not said key transpose value is less than or equal to said second predetermined limit if said key transpose value has been determined not to be greater than or equal to zero;

setting a down-key transpose flag if it has been determined that said key transpose value is less than or equal to said second predetermined limit;

decreasing said identification number of said first depressed key by one octave when it has been determined that said key transpose value is not less than or equal to said second predetermined limit, to develop a new identification number for said first depressed key;

determining the difference between said new identification number and said identification number of said second depressed key to produce a new key transpose value; and storing said new key transpose value in said register.

5. The method as set forth in claim 3, wherein said step of determining whether or not said key transpose value is within a first or second predetermined limit further comprises the steps of:

determining whether or not said key transpose value is equal to zero if said key transpose value has been determined not to be greater than zero;

determining whether or not said key transpose value is less than or equal to said second predetermined limit if said key transpose value has been determined not to be greater than or equal to zero;

setting a down-key transpose flag if it has been determined that said key transpose value is less than or equal to said second predetermined limit;

decreasing said identification number of said first depressed key by one octave when it has been determined that said key transpose value is not less than or equal to said second predetermined limit, to develop a new identification number for said first depressed key;

determining the difference between said new identification number and said identification number of said second depressed key to produce a new key transpose value; and storing said new key transpose value in said register.

6. The method as set forth in claim 4, wherein said second predetermined limit is less than said first predetermined limit and said predetermined range is the keys within one octave.

7. A method for transposing keys of a keyboard of an electronic musical instrument, each key having a corresponding keyboard number, said method comprising the steps of:

determining whether or not a key transpose switch is activated;

storing a keyboard number representing a depressed key when said key transpose switch has been determined to have been activated;

determining whether or not said depressed key is within a predetermined range of said keyboard keys;

generating an error tone when it has been determined that said depressed key is not within said predetermined range of said keyboard keys;

detecting said keyboard number representing said depressed key when it has been determined that said first depressed key is within said predetermined range;

determining whether or not said detected keyboard number is greater to a predetermined keyboard number;

determining whether or not said detected keyboard number is greater than said predetermined keyboard number if it has been determined that said detected keyboard number is not equal to said predetermined keyboard number;

generating a key transpose value by calculating the difference between said detected keyboard number and said predetermined keyboard number; and storing said key transpose value in a register.

8. The method as claimed in claim 7, wherein said generating step comprises the steps of:

subtracting said predetermined keyboard number from said detected keyboard number when it has been determined that said detected keyboard number is greater than said predetermined keyboard number to generate said key transpose value and setting an up-key transpose flag; or subtracting said detected keyboard number from said predetermined keyboard number when it has been determined that said detected keyboard number is not greater than or equal to said predetermined keyboard number to generate said key transpose value and setting a down-key transpose flag.

9. An electronic musical instrument for transposing a key, comprising:

a key transpose switch;

a keyboard having a plurality of keys, each key having a corresponding identification number;

a microcomputer for determining whether or not said key transpose switch is activated;

said microcomputer storing data of a first depressed key of said keyboard when said key transpose switch has been determined to have been activated;

said microcomputer determining whether or not said first depressed key is within a predetermined range of said keyboard keys;

said microcomputer detecting an identification number representing said first depressed key when it has been determined that said first depressed key is within said predetermined range;

said microcomputer storing data of a second depressed key;

said microcomputer determining whether or not said second depressed key is within said predetermined range of said keyboard keys;

said microcomputer detecting an identification number representing said second depressed key when it has been determined that said second depressed key is within said predetermined range;

said microcomputer generating a key transpose value by calculating the difference between said identification numbers of said first and second depressed keys;

said microcomputer determining whether or not said key transpose value is within a first or second predetermined limit, said first and second predetermined limits together being less than said predetermined range;

said microcomputer storing said key transpose value into a register;

sound generation means for producing tones according to said stored key transpose value when said first depressed key is played after said key transpose switch is deactivated.

* * * * *

UNITED STATES PATENT AND TRADEMARK OFFICE

CERTIFICATE OF CORRECTION

PATENT NO. : 5,083,493

DATED : January 28, 1992

INVENTOR(S) : Tae-Kyoung Heo

It is certified that error appears in the above-identified patent and that said Letters Patent is hereby corrected as shown below:

Column 3, Line 9, replace "3" with --3A--;

Line 61, delete "key" (first occurrence);

Column 4, Line 11, delete "it", and insert --to-- before "determine";

Line 14, insert a period after "ended";

Column 5, Line 30, delete "it";

Claim 7, Column 8, Line 4, replace "greater" with --equal--.

Signed and Sealed this

Thirteenth Day of July, 1993

Attest:

Michael K. Kirk

MICHAEL K. KIRK

*Attesting Officer*

*Acting Commissioner of Patents and Trademarks*